US012758867B2

(12) United States Patent
Lee et al.

(10) Patent No.: US 12,758,867 B2
(45) Date of Patent: Oct. 13, 2026

(54) BUTTON STRUCTURE

(71) Applicant: CHENG UEI PRECISION INDUSTRY CO., LTD., New Taipei City (TW)

(72) Inventors: Tsung-Shih Lee, New Taipei City (TW); Yi Hsu, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 137 days.

(21) Appl. No.: 18/959,590

(22) Filed: Nov. 25, 2024

(65) Prior Publication Data

US 2025/0381473 A1 Dec. 18, 2025

(30) Foreign Application Priority Data

Jun. 14, 2024 (CN) ......................... 202421371592.3

(51) Int. Cl.
*A63F 13/00* (2014.01)
*A63F 13/24* (2014.01)
*A63F 13/285* (2014.01)

(52) U.S. Cl.
CPC ............ *A63F 13/285* (2014.09); *A63F 13/24* (2014.09)

(58) Field of Classification Search
None
See application file for complete search history.

(56) References Cited

U.S. PATENT DOCUMENTS

| | | | | |
|---|---|---|---|---|
| 7,960,665 | B2 * | 6/2011 | Sakai | H01H 25/00 200/345 |
| 10,475,606 | B2 * | 11/2019 | Schmitz | H01H 13/20 |
| 2007/0060291 | A1 * | 3/2007 | Cole | G07F 17/32 463/20 |
| 2010/0116629 | A1 * | 5/2010 | Borissov | H01H 25/008 200/341 |
| 2022/0305375 | A1 * | 9/2022 | Morita | A63F 13/24 |

* cited by examiner

*Primary Examiner* — Sunit Pandya
(74) *Attorney, Agent, or Firm* — Cheng-Ju Chiang

(57) ABSTRACT

A button structure includes a push button, a housing enclosing the push button, a supporting unit and a circuit board. The push button has an outer wall. Several portions of a bottom of the outer wall extend outward to form a plurality of projection parts evenly distributed around the outer wall. Each projection part extends along a radial direction of the outer wall. One side of each projection part extends outward and along a circumferential direction of the push button to form an elastic arm. A middle of the elastic arm is arched outward and opposite to the outer wall. The supporting unit is mounted inside the push button. The push button is disposed on an upper surface of the circuit board. The housing is disposed on the upper surface of the circuit board. The supporting unit is fastened between the circuit board and the push button.

13 Claims, 10 Drawing Sheets

BUTTON STRUCTURE

CROSS REFERENCE TO RELATED APPLICATIONS

The present application is based on, and claims priority from, China Patent Application No. 202421371592.3, filed Jun. 14, 2024, the disclosure of which is hereby incorporated by reference herein in its entirety.

BACKGROUND OF THE INVENTION

Field of the Invention

The present invention generally relates to a button structure, and more particularly to a button structure which is used in a game controller, improves an operating hand feeling in use, is assembled stably and lowers a cost.

Description of Related Art

A directional pad (D-pad) belongs to a standard component of a game controller. Most of the game controllers are equipped with the D-pads. The D-pad includes four push buttons with different functions, and the D-pad is used for moving in four directions which are an upward direction, a downward direction, a leftward direction and a rightward direction. A bottom of the D-pad is in contact with a metal button which is arranged on a circuit board for providing a feedback force so as to improve an operating hand feeling.

A control panel assembly for an inputting device includes a bracket with a supporting element having a supporting surface, a button cap configured to pivot relative to the bracket, and a returning mechanism configured to make the button cap offset towards the bracket. The button cap has an outer lip, and a pivoting element configured to resist against the supporting surface of the supporting element. The returning mechanism includes a hub portion of which at least one part is positioned between the button cap and the bracket, and at least one first spring. The at least one first spring has a fixing end connected to the hub portion, and a free end configured to be deflected relative to the fixing end. The free end of the at least one first spring is coupled to a first portion of the outer lip of the button cap. The game controller is equipped with the metal button of the circuit board which is combined with the D-pad to provide operating feedback so as to improve the operating hand feeling.

However, a gap between the D-pad and the metal button is apt to be caused to affect the operating hand feeling, and the metal button is more costly to be manufactured. Furthermore, the metal button which is arranged on the circuit board of the game controller has a poor rebound effect.

Therefore, it is necessary to provide an innovative button structure which is used in the game controller, improves an operating hand feeling in use, is assembled stably and lowers a cost.

BRIEF SUMMARY OF THE INVENTION

An object of the present invention is to provide a button structure which is used in a game controller, improves an operating hand feeling in use, is assembled stably and lowers a cost. The button structure includes a push button, a housing, a supporting unit and a circuit board. The push button has an outer wall and a plurality of elastic arms. Several portions of a bottom of the outer wall of the push button extend outward to form a plurality of projection parts.

The plurality of the projection parts are evenly distributed around the outer wall of the push button. Each projection part extends along a radial direction of the outer wall of the push button. One side of each projection part extends outward and along a circumferential direction of the push button to form an elastic arm. A middle of the elastic arm is arched outward and opposite to the outer wall. The elastic arm has a first arc portion, a bending portion and a second arc portion. The one side of each projection part extends outward and along the circumferential direction of the push button to form the first arc portion. One end of the first arc portion which is opposite to the one side of each projection part is bent outward and then is bent inward to form the bending portion. One end of the bending portion extends outward and along the circumferential direction of the push button to form the second arc portion. The second arc portion is disposed opposite to the first arc portion. The housing encloses the push button. Several portions of a lower surface of the housing protrude downward to form a plurality of stopping blocks. The second arc portions of the plurality of the elastic arms abut against bottom surfaces of the plurality of the stopping blocks. The supporting unit is mounted inside the push button. The push button is disposed on an upper surface of the circuit board. The housing is disposed on the upper surface of the circuit board. The supporting unit is fastened between the circuit board and the push button.

Another object of the present invention is to provide a button structure. The button structure includes a push button, a housing, a supporting unit and a circuit board. The push button has a top wall, an outer wall, a plurality of elastic arms, and a directional pad formed on a top surface of the top wall. Several portions of a bottom of the outer wall of the push button extend outward to form a plurality of projection parts. The plurality of the projection parts are evenly distributed around the outer wall of the push button. Each projection part extends along a radial direction of the outer wall of the push button. The plurality of the projection parts are disposed corresponding to the directional pad. One side of each projection part extends outward and along a circumferential direction of the push button to form an elastic arm. A middle of the elastic arm is arched outward and opposite to the outer wall. The clastic arm has a first arc portion, a bending portion and a second arc portion. The one side of each projection part extends outward and along the circumferential direction of the push button to form the first arc portion. One end of the first arc portion which is opposite to the one side of each projection part is bent outward and then is bent inward to form the bending portion. One end of the bending portion extends outward and along the circumferential direction of the push button to form the second arc portion. The second arc portion is disposed opposite to the first arc portion. The housing encloses the push button. The housing has a top board, a plurality of first bays, a plurality of second bays, a plurality of stopping parts, and a lateral wall connected to an outer periphery of the top board. Several portions of a bottom of the lateral wall extend downward to form a plurality of first retaining walls and a plurality of second retaining walls. The plurality of the first arc portions of the plurality of the elastic arms are positioned to inner surfaces of the plurality of the first retaining walls. The plurality of the second arc portions are positioned to inner surfaces of the plurality of the second retaining walls. The plurality of the first bays are formed among the plurality of the first retaining walls and the plurality of the second retaining walls. The bending portions of the plurality of the elastic arms are positioned in the plurality of the first bays.

The plurality of the second bays are formed among the plurality of the first retaining walls and the plurality of the second retaining walls. The plurality of the projection parts are positioned in the plurality of the second bays. Each stopping part includes one first retaining wall, one second retaining wall, one first bay and one second bay. Each stopping part is disposed corresponding to one projection part, and one elastic arm which is connected to the one projection part. The second arc portions of the plurality of the elastic arms abut against inner portions of the plurality of the second retaining walls. The supporting unit is mounted inside the push button. The push button is disposed on an upper surface of the circuit board. The housing is disposed on the upper surface of the circuit board. The supporting unit is fastened between the circuit board and the push button.

Another object of the present invention is to provide a button structure. The button structure includes a push button, a housing, a supporting unit and a circuit board. The push button has a top wall, at least two pressing areas, at least two connection sections, at least two projection parts and at least two elastic arms. The at least two pressing areas are disposed on a top surface of the top wall, and the at least two pressing areas are positioned oppositely. The at least two connection sections are connected to bottoms of the at least two pressing areas. The at least two projection parts are extended outward from the at least two connection sections. The at least two elastic arms are cantilevered. The at least two elastic arms are extended along a circumferential direction of the push button from one sides of the at least two projection parts, and the at least two elastic arms are extended in the same direction. The housing is mounted around the push button. An inner surface of the housing keeps a distance from upper surfaces of the at least two projection parts. Inner portions of the housing abut against tail ends of the at least two elastic arms. The supporting unit is mounted inside the push button. The push button is disposed on an upper surface of the circuit board. The housing is disposed on the upper surface of the circuit board. Bottoms of the at least two connection sections are arranged corresponding to the circuit board, and the supporting unit is fastened between the circuit board and the push button. When each pressing area in one direction is pressed downward, the bottom of the corresponding connection section presses downward on the circuit board, when the pressing area is released, the corresponding connection section moves upward and returns to an original position.

As described above, the plurality of the elastic arms of the button structure are used to provide an excellent hand feeling and better tactile feedback for a user. Furthermore, the one side of each projection part extends outward and along the circumferential direction of the push button to form the first arc portion, and the one end of the first arc portion is bent outward and then is bent inward to form the bending portion, so the bending portion is used to reduce risks of a plastic deformation and a fracture of the elastic arm, thereby a usage lifespan of the elastic arm is increased. In addition, the one end of the bending portion extends outward and along the circumferential direction of the push button to form the second arc portion, so when each pressing area in the one direction of the directional pad of the push button is pressed downward, the corresponding projection part, and the first arc portion, the bending portion and the second arc portion of the corresponding elastic arm all move downward, simultaneously, the projection part, the first arc portion and the bending portion in the opposite direction which is opposite to the pressed pressing area move upward, and the second arc portion in the opposite direction abuts against a lower end of the stopping block which is corresponding to the second arc portion in the opposite direction. As a result, the button structure is used in a game controller, improves an operating hand feeling in use, is assembled stably and lowers a cost.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
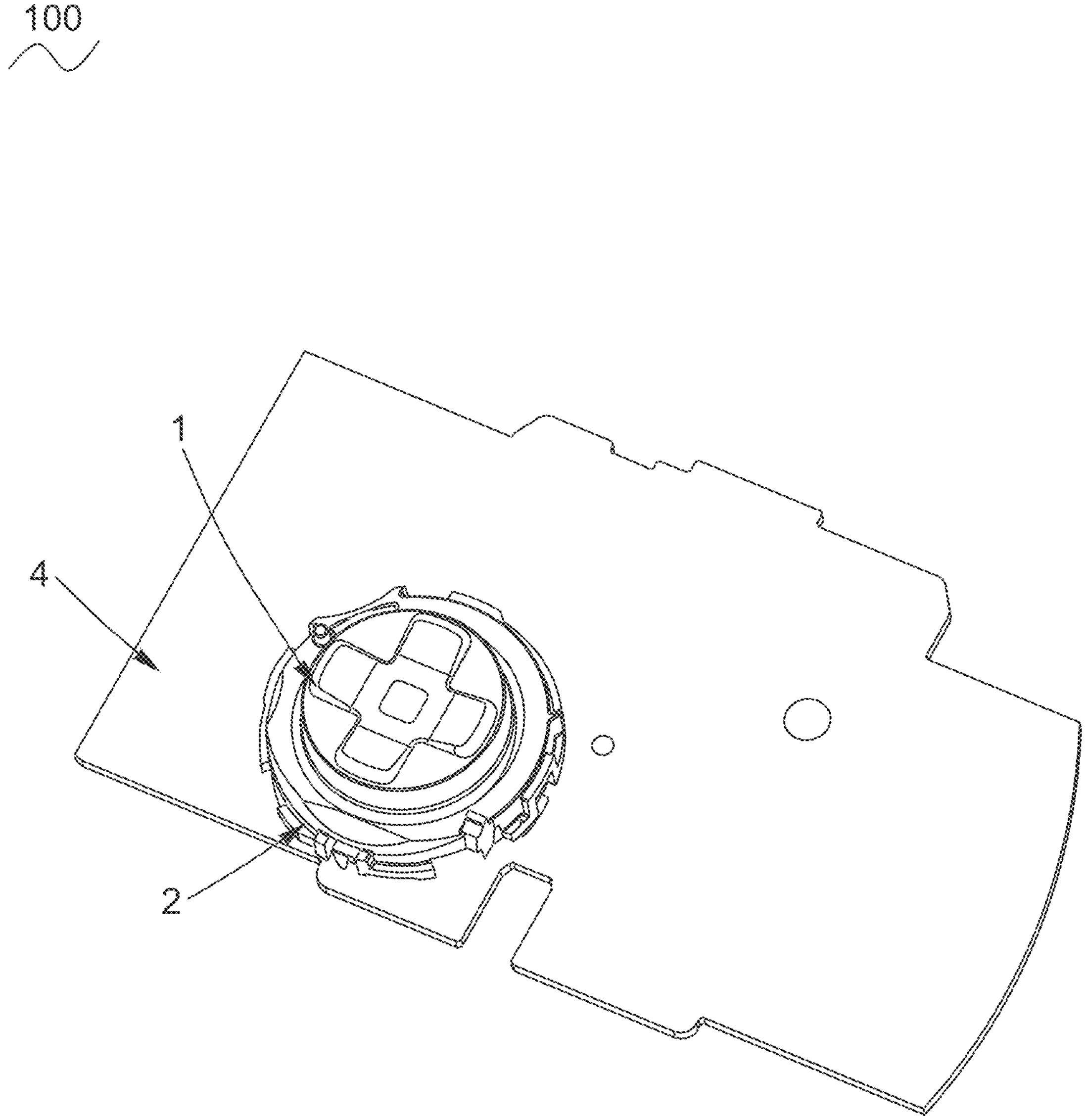
FIG. 1 is a perspective view of a button structure according to the present invention.
Figure 2:
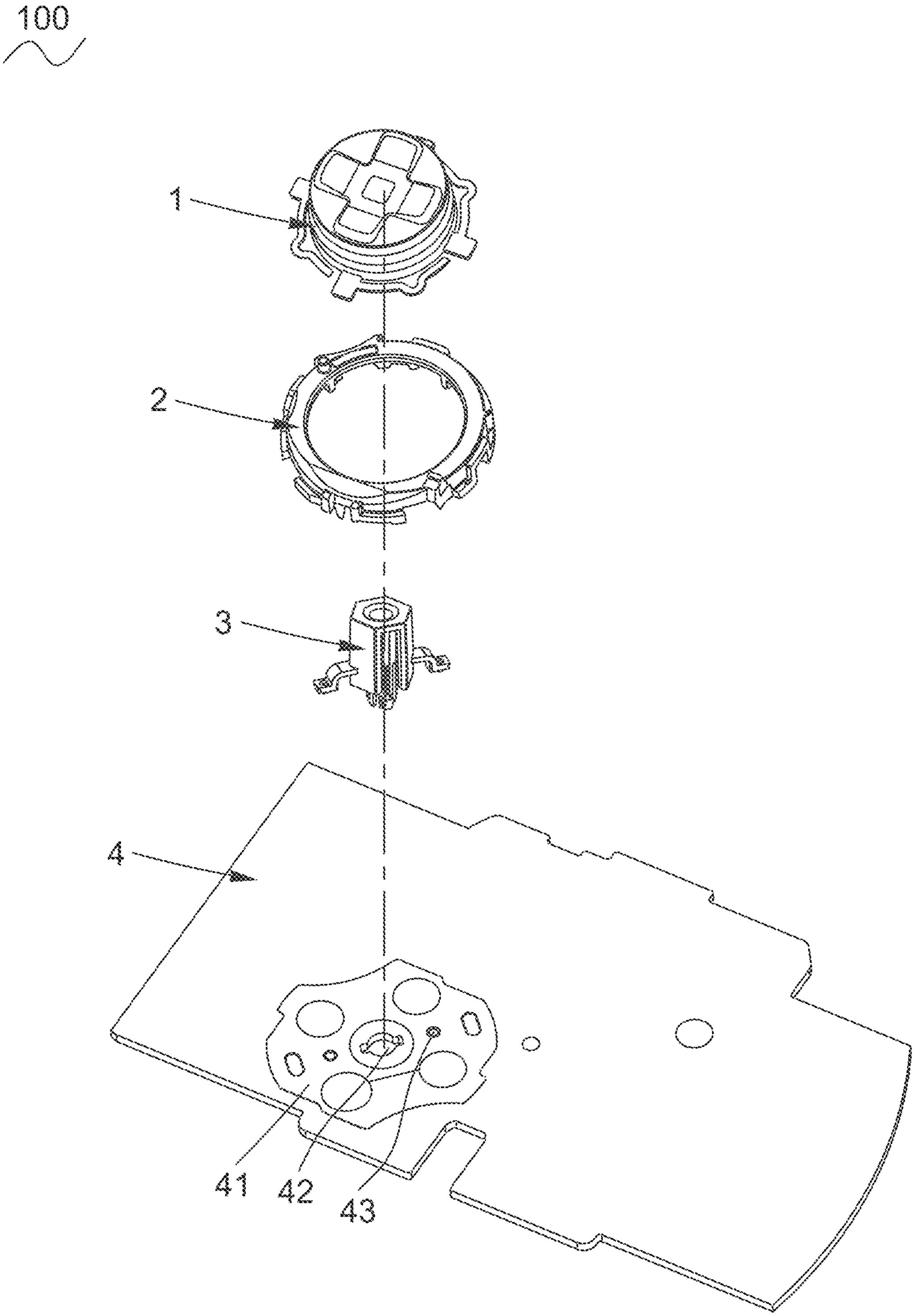
FIG. 2 is an exploded view of the button structure according to the present invention.

Referring to FIG. 1 and FIG. 2, a button structure 100 according to the present invention is shown. The button structure 100 includes a push button 1, a housing 2 enclosing the push button 1, a supporting unit 3 and a circuit board 4. The push button 1 is disposed on an upper surface of the circuit board 4. The housing 2 is disposed on the upper surface of the circuit board 4 for enclosing the push button 1. The supporting unit 3 is mounted inside the push button 1. The supporting unit 3 partially passes through the circuit board 4, and the supporting unit 3 is fixed to the circuit board 4. The supporting unit 3 is fastened between the circuit board 4 and the push button 1.

Figure 3:
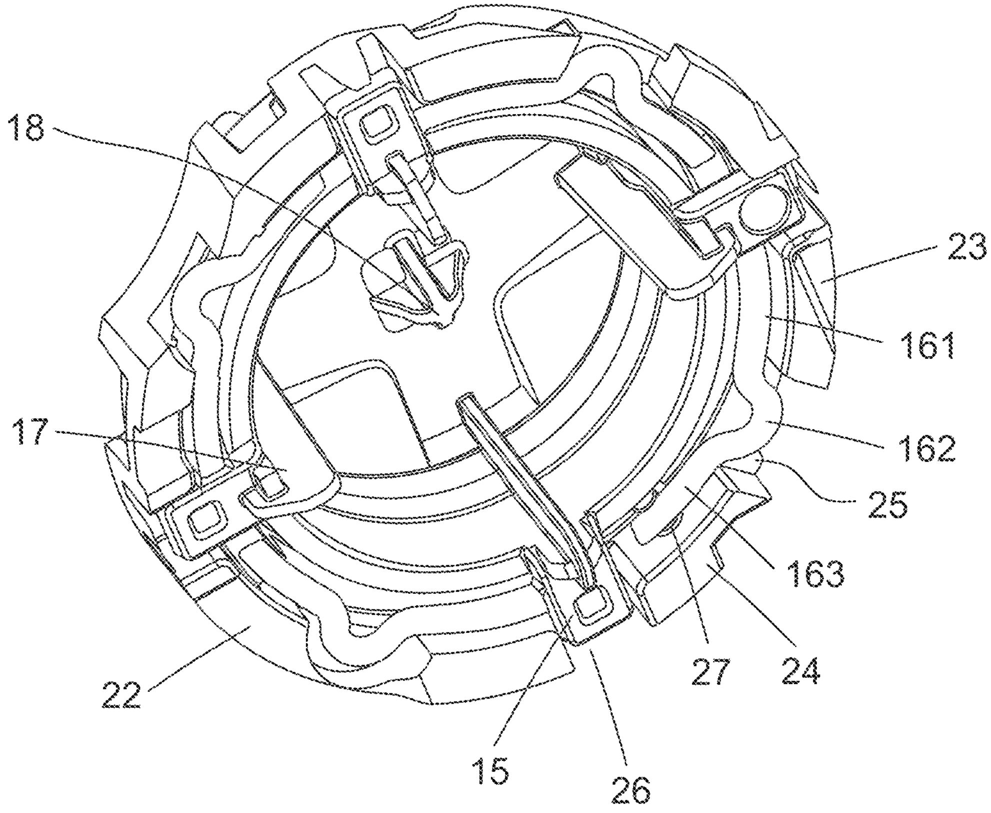
FIG. 3 is a partially perspective view of the button structure according to the present invention.
Figure 4:
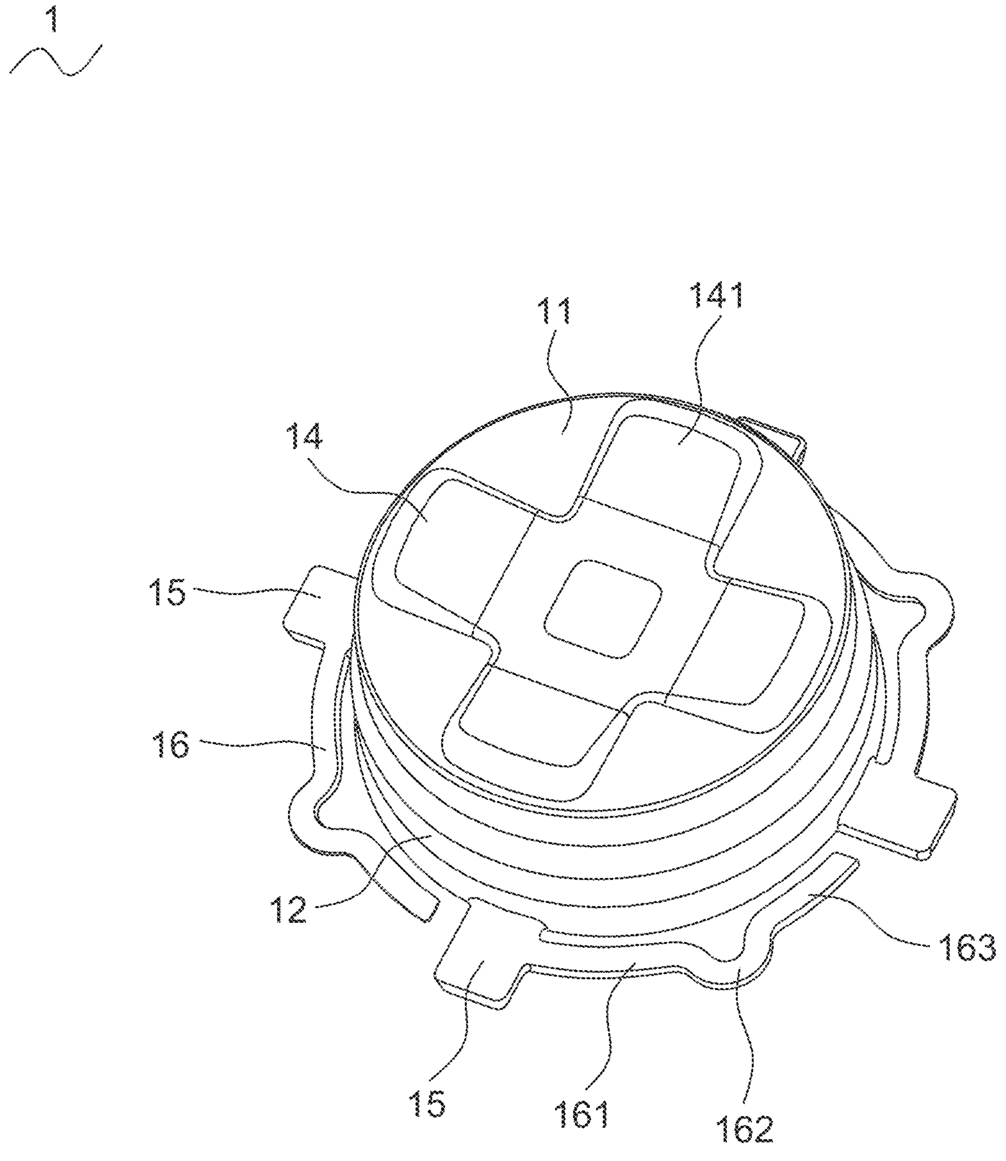
FIG. 4 is a perspective view of a push button of the button structure according to the present invention.
Figure 5:
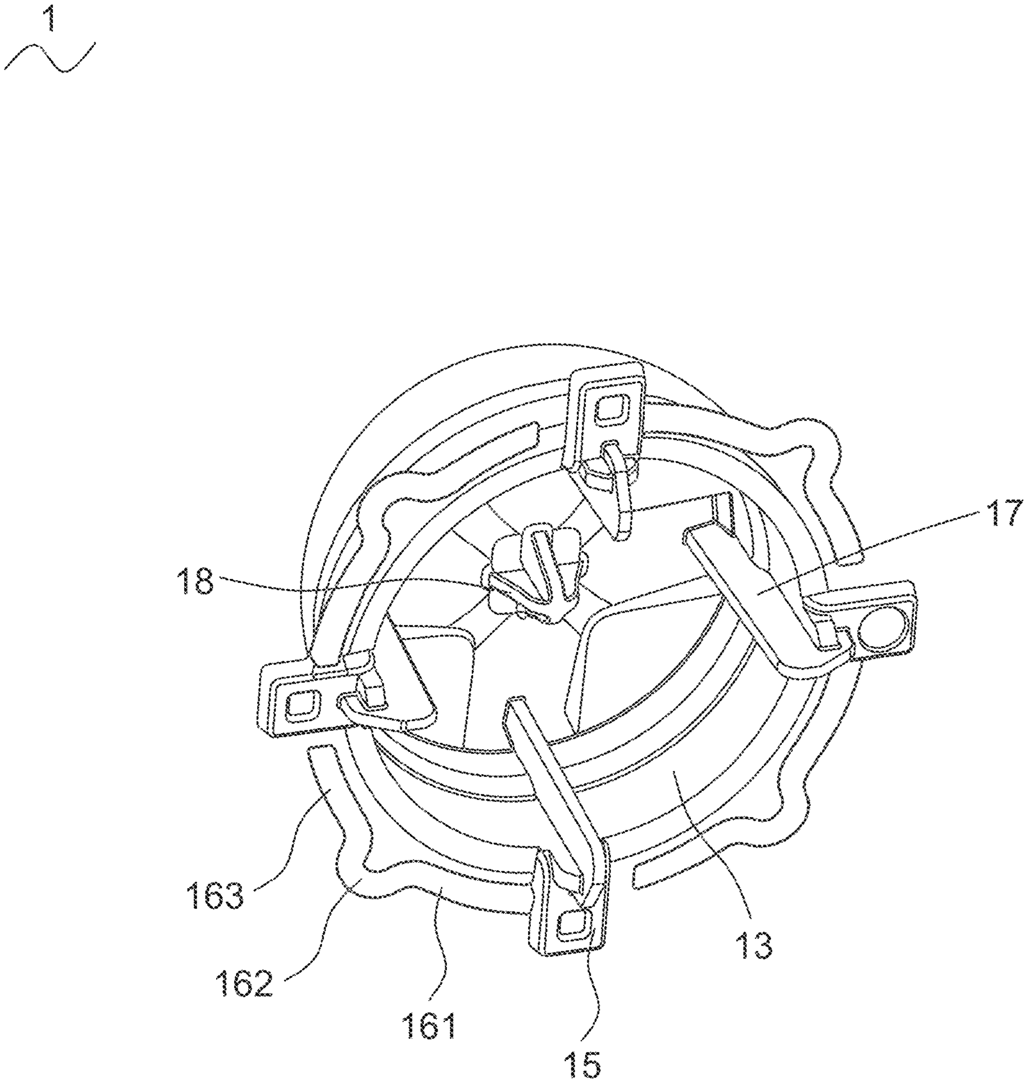
FIG. 5 is another perspective view of the push button of the button structure according to the present invention.
Figure 6:
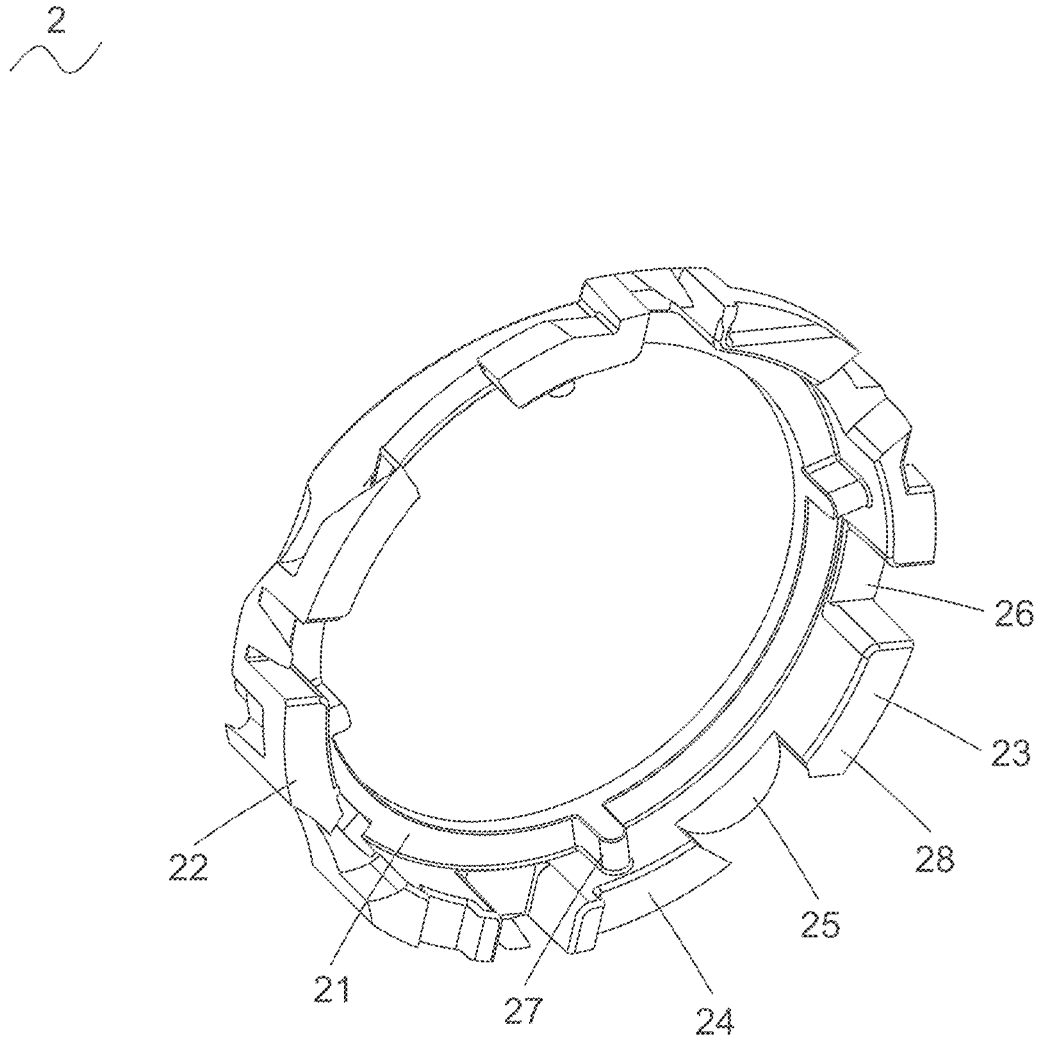
FIG. 6 is a perspective view of a housing of the button structure according to the present invention.
Figure 7:
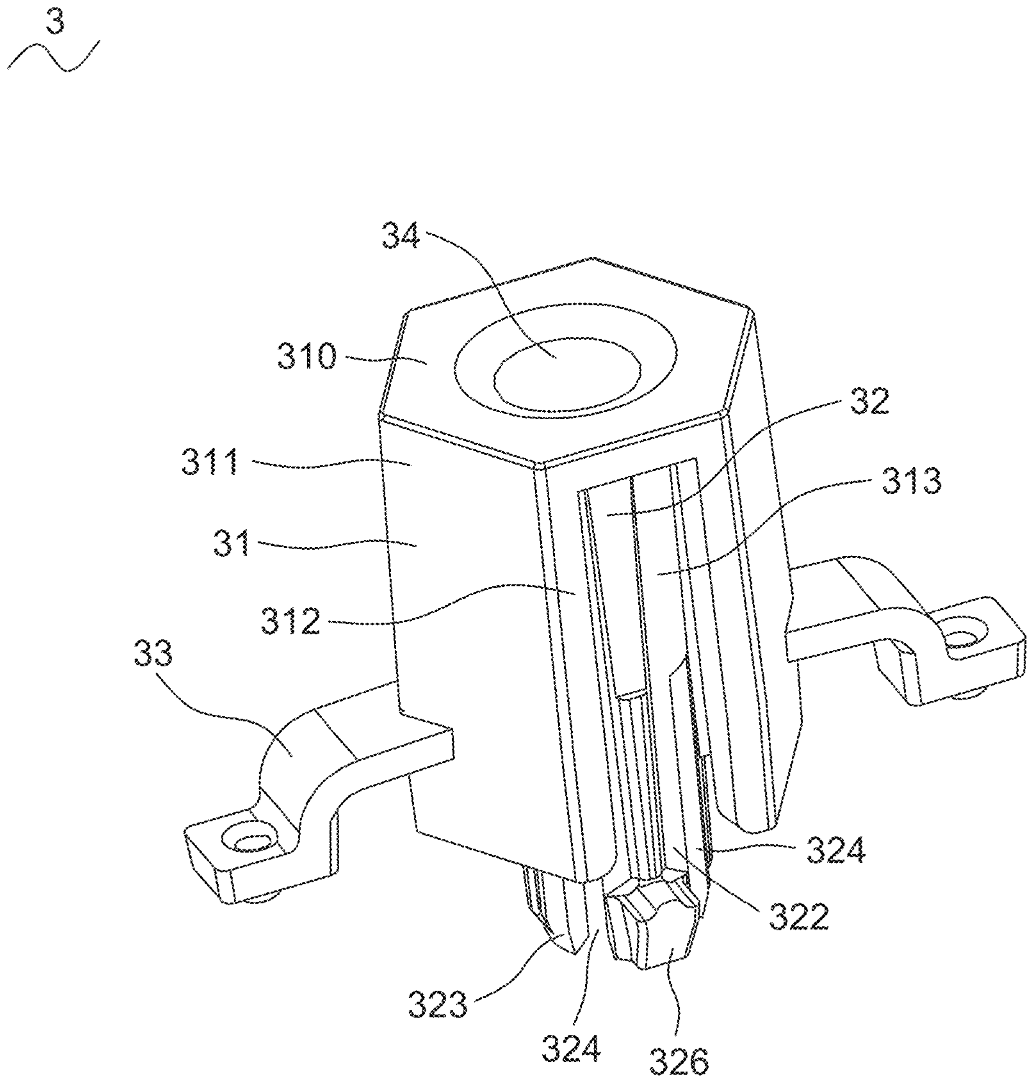
FIG. 7 is a perspective view of a supporting unit of the button structure in accordance with the present invention.
Figure 8:
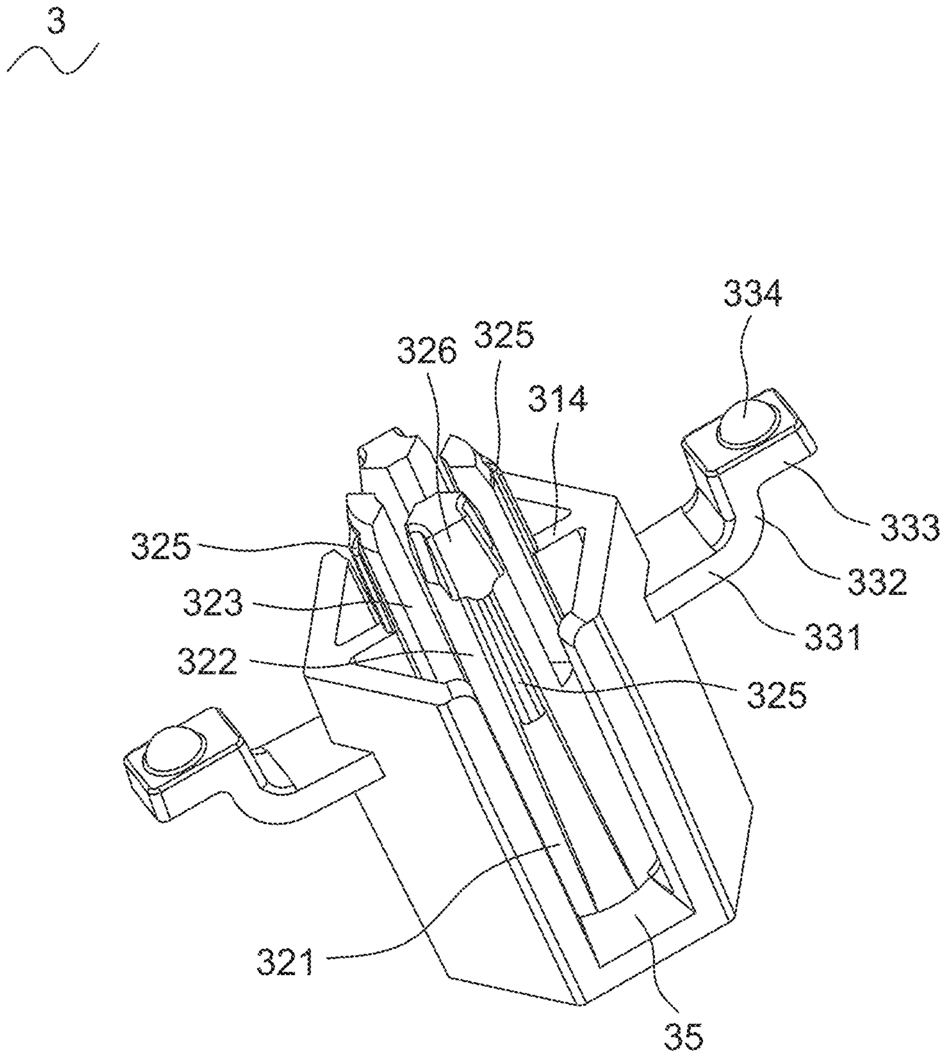
FIG. 8 is another perspective view of the supporting unit of the button structure according to the present invention.
Figure 9:
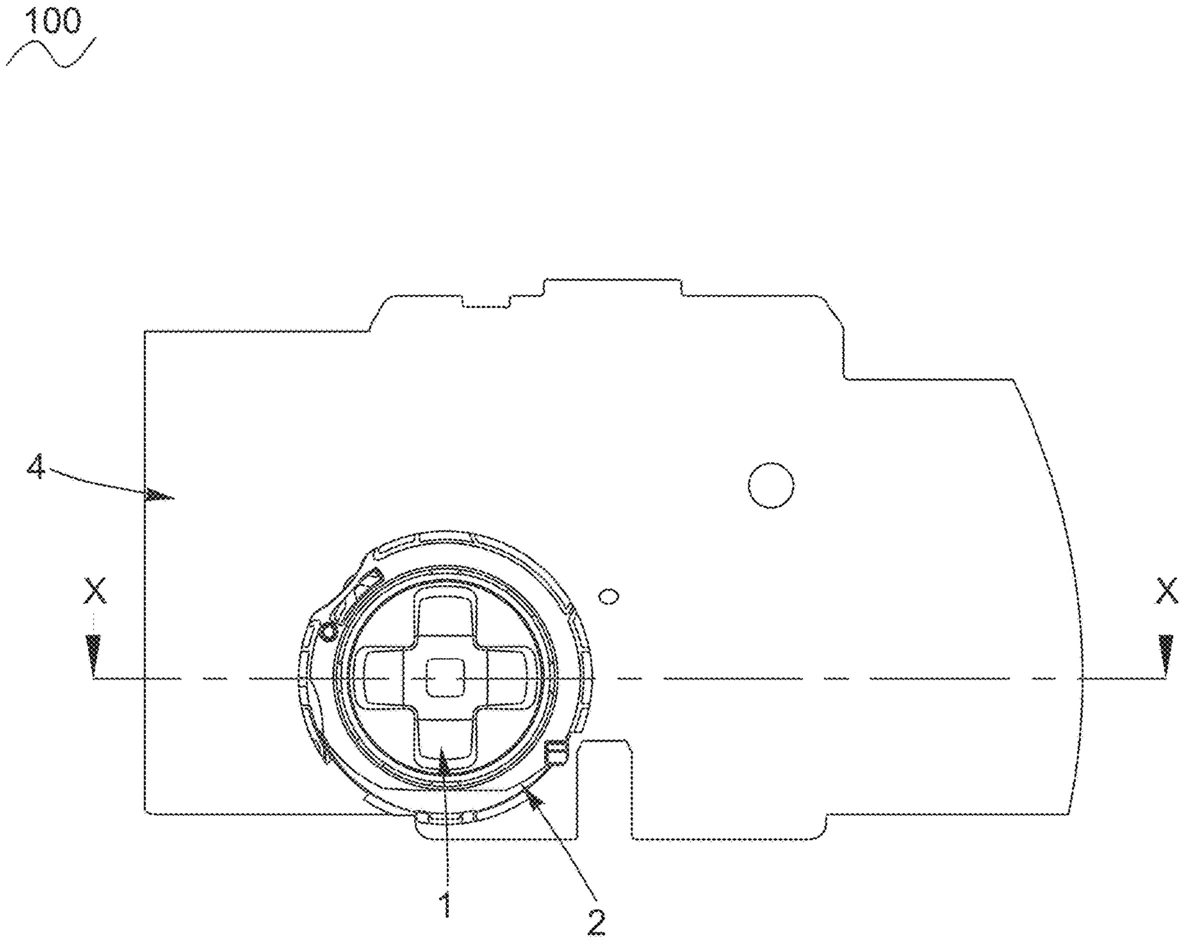
FIG. 9 is a schematic diagram of the button structure according to the present invention.
Figure 10:
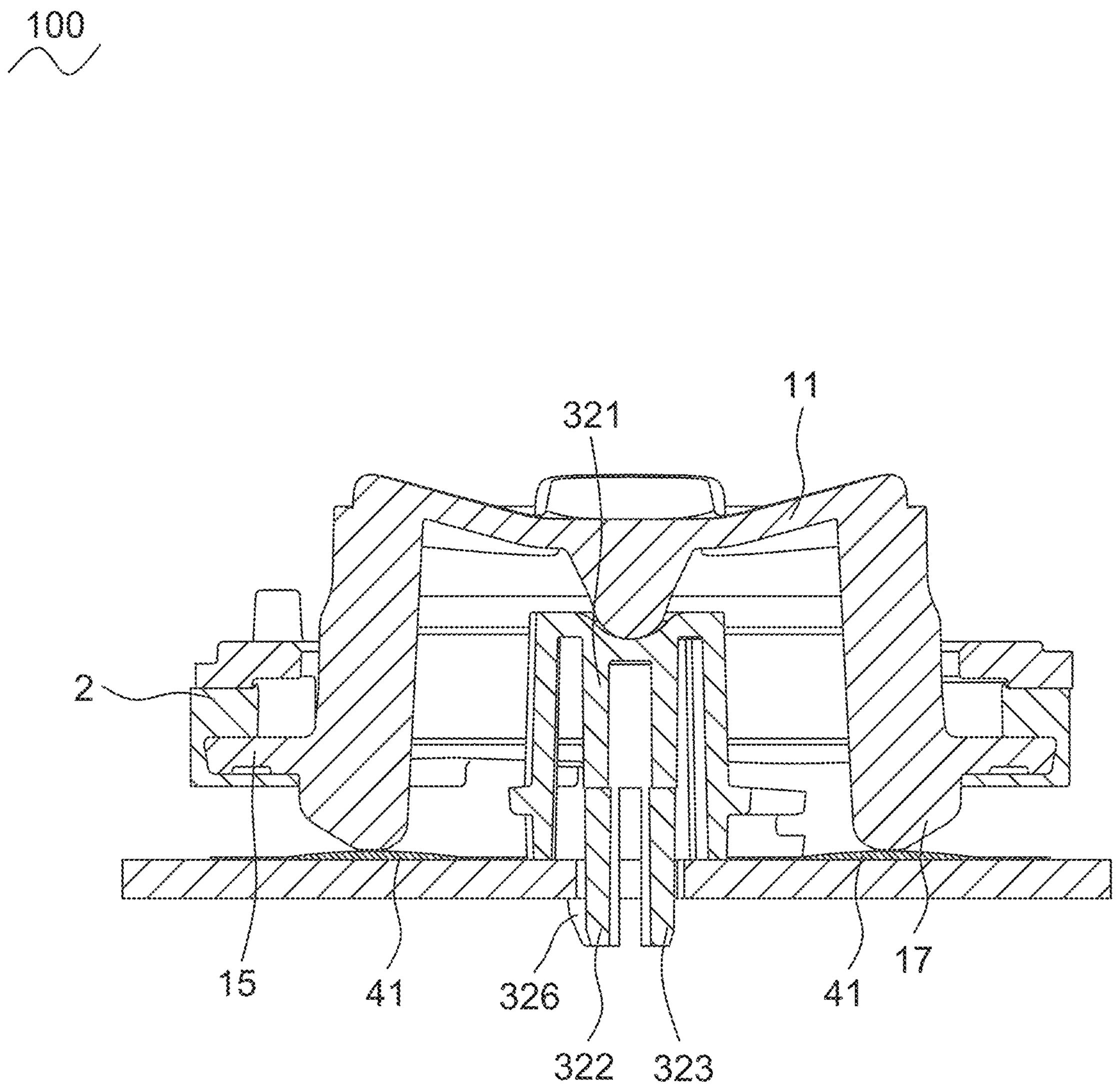
FIG. 10 is a cross-sectional view of the button structure along a line X-X of FIG. 9.

Referring to FIG. 3 to FIG. 5, the push button 1 is a hollow cylinder shape, and a bottom of the push button 1 is opened freely. The push button 1 has a top wall 11, an outer wall 12, an annular inner wall 13, a directional pad 14, a plurality of projection parts 15, a plurality of elastic arms 16, a plurality of connection sections 17 and a protruding column 18. The directional pad 14 is formed on a top surface of the top wall 11 of the push button 1. A middle of a bottom surface of the top wall 11 of the push button 1 protrudes downward to form the protruding column 18. The protruding column 18 is disposed in a corresponding mechanism of the supporting unit 3. The directional pad 14 has four pressing areas 141 in four directions, respectively. The directional pad 14 is shown as a cross shape.

Several portions of a bottom of the outer wall 12 of the push button 1 extend outward to form the plurality of the projection parts 15. The plurality of the projection parts 15 are evenly distributed around the outer wall 12 of the push button 1. Each projection part 15 extends along a radial direction of the outer wall 12 of the push button 1. The plurality of the projection parts 15 are positioned in a corresponding mechanism of the housing 2. The plurality of the projection parts 15 are disposed corresponding to the directional pad 14. Specifically, the push button 1 has four projection parts 15. The four projection parts 15 are arranged corresponding to the D-pad 14. The four projection parts 15 are corresponding to the four pressing areas 141 of the directional pad 14. The plurality of the projection parts 15 are also arranged corresponding to a metal button 41 arranged on the circuit board 4. One side of each projection part 15 extends outward and along a circumferential direction of the push button 1 to form the elastic arm 16. A middle of the clastic arm 16 is arched outward and opposite to the outer wall 12 of the push button 1. The elastic arm 16 extends around a periphery of the push button 1. The elastic arm 16 is used to provide a tactile feedback for a user. The elastic arm 16 is used to provide a better pressing hand feeling for the user. In the present invention, the circuit board 4 is closer to the plurality of the projection parts 15 than to the plurality of the elastic arms 16.

The elastic arm 16 has a first arc portion 161, a bending portion 162 and a second arc portion 163. The one side of each projection part 15 extends outward and along the circumferential direction of the push button 1 to form the first arc portion 161. One end of the first arc portion 161 which is opposite to the one side of each projection part 15 is bent outward and then is bent inward to form the bending portion 162. Specifically, a free end of the first arc portion 161 is arched outward to form the bending portion 162. The bending portion 162 is positioned in a corresponding region of the housing 2. The bending portion 162 is used to reduce risks of a plastic deformation and a fracture of the clastic arm 16, thereby a usage lifespan of the elastic arm 16 is increased. One end of the bending portion 162 extends outward and along the circumferential direction of the push button 1 to form the second arc portion 163. A free end of the bending portion 162 extends outward and along the circumferential direction of the push button 1 to form the second arc portion 163. The second arc portion 163 is disposed opposite to the first arc portion 161. Each elastic arm 16 is formed between two adjacent projection parts 15. In the present invention, the one side of the projection part 15 is connected with the first arc portion 161 of one elastic arm 16, and the other side of the projection part 15 is close to and is spaced from the second arc portion 163 of another elastic arm 16. The first arc portion 161 of each elastic arm 16 is connected with the one side of one projection part 15, and the second arc portion 163 of each clastic arm 16 is away from the one side of the one projection part 15. The second arc portion 163 abuts against a corresponding segment of the housing 2.

When each pressing area 141 in one direction of the directional pad 14 is pressed, the corresponding projection part 15, and the first arc portion 161, the bending portion 162 and the second arc portion 163 of the corresponding elastic arm 16 move downward. Meanwhile, the projection part 15, the first arc portion 161 and the bending portion 162 in an opposite direction which is opposite to the pressed pressing area 141 move upward, and the second arc portion 163 in the opposite direction abuts against the corresponding segment of the housing 2. Thus, the button structure 100 has the excellent hand feeling and the better tactile feedback.

The inner wall 13 is shown as an annular shape. The inner wall 13 has a plurality of connection sections 17. Several portions of the inner wall 13 protrude inward, and then extend upward and downward to form the plurality of the connection sections 17. Each connection section 17 extends along a radial direction of the inner wall 13. The plurality of the connection sections 17 are evenly distributed to an inner periphery of the inner wall 13 along a peripheral direction of the inner wall 13. The plurality of the connection sections 17 are disposed corresponding to the directional pad 14. In the present invention, the inner wall 13 has four connection sections 17. The four connection sections 17 are arranged corresponding to the four directions of the directional pad 14. The four connection sections 17 are corresponding to the four pressing areas 141 of the directional pad 14 which are in the four directions, and the four connection sections 17 are connected beneath the four pressing areas 141 of the directional pad 14 which are in the four directions. The plurality of the connection sections 17 are arranged corresponding to the plurality of the projection parts 15. Outer portions of bottoms of the plurality of the connection sections 17 are connected to inner portions of the plurality of the projection parts 15. Tops of the plurality of the connection sections 17 are connected to inner surfaces of the four pressing areas 141 of the directional pad 14 which are in the four directions. The bottoms of the plurality of the connection sections 17 are arranged corresponding to the metal button 41 on the circuit board 4.

When each pressing area 141 of the directional pad 14 in the one direction is pressed downward, the bottom of the corresponding connection section 17 presses downward on the metal button 41 of the circuit board 4. When the directional pad 14 is released, the connection section 17 moves upward and returns to an original position of the corresponding connection section 17 due to an elastic restoring force of the corresponding clastic arm 16. Thereby, the metal button 41 of the circuit board 4 also rebounds to an original position of the metal button 41.

Referring to FIG. 3 to FIG. 6, the housing 2 has a top board 21, a lateral wall 22, a plurality of first retaining walls 23, a plurality of second retaining walls 24, a plurality of first bays 25, a plurality of second bays 26 a plurality of stopping blocks 27 and a plurality of stopping parts 28. Several portions of a lower surface of the housing 2 protrude downward to form the plurality of the stopping blocks 27. Several portions of a bottom surface of the top board 21 extend downward to form the plurality of the stopping blocks 27. The second arc portions 163 of the plurality of the elastic arms 16 of the push button 1 abut against bottom surfaces of the plurality of the stopping blocks 27.

The lateral wall 22 is connected to an outer periphery of the top board 21. Several portions of a bottom of the lateral wall 22 extend downward to form the plurality of the first retaining walls 23 and the plurality of the second retaining walls 24. The plurality of the first retaining walls 23 are arranged corresponding to the first arc portions 161 of the plurality of the elastic arms 16 of the push button 1. The plurality of the first arc portions 161 of the plurality of the elastic arms 16 are positioned to inner surfaces of the plurality of the first retaining walls 23. The plurality of the second retaining walls 24 are arranged corresponding to the second arc portions 163 of the plurality of the elastic arms 16 of the push button 1. The plurality of the second arc portions 163 of the plurality of the elastic arms 16 are positioned to inner surfaces of the plurality of the second retaining walls 24. The plurality of the second retaining walls 24 are arranged corresponding to the plurality of the stopping blocks 27. The inner surfaces of the plurality of the second retaining walls 24 are connected to the plurality of the stopping blocks 27. The plurality of the stopping blocks 27 are disposed to inner portions of the plurality of the second retaining walls 24. The second arc portions 163 of the plurality of the elastic arms 16 of the push button 1 abut against the inner portions of the plurality of the second retaining walls 24.

In the present invention, the plurality of the first retaining walls 23, the plurality of the second retaining walls 24, the plurality of the first bays 25 and the plurality of the second bays 26 together form the plurality of the stopping parts 28. Specifically, the housing 2 has four stopping parts 28. Each stopping part 28 includes one first retaining wall 23, one second retaining wall 24, one first bay 25 and one second bay 26. The plurality of the stopping parts 28 are arranged corresponding to the plurality of the projection parts 15, and the elastic arms 16 which are connected to the plurality of the projection parts 15. The four stopping parts 28 are arranged corresponding to the four projection parts 15, and the elastic arms 16 which are connected to the four projection parts 15. Each stopping part 28 is disposed corresponding to the one projection part 15, and the one elastic arm 16 which is connected to the one projection part 15. For each stopping part 28, the first bay 25 is formed between the first retaining wall 23 and the second retaining wall 24. Each second bay 26 is formed between the first retaining wall 23 and the second retaining wall 24 of two adjacent stopping parts 28. Each second bay 26 is formed between the first retaining wall 23 of one stopping part 28 and the second retaining wall 24 of the stopping part 28 which is adjacent to the one stopping part 28.

The plurality of the first bays 25 are formed among the plurality of the first retaining walls 23 and the plurality of the second retaining walls 24. The plurality of the first bays 25 are arranged corresponding to the bending portions 162 of the plurality of the elastic arms 16 of the push button 1, and the bending portions 162 of the plurality of the elastic arms 16 are positioned in the plurality of the first bays 25. The plurality of the second bays 26 are formed among the plurality of the first retaining walls 23 and the plurality of the second retaining walls 24. The plurality of the second bays 26 are arranged corresponding to the plurality of the projection parts 15 of the push button 1, and the plurality of the projection parts 15 are positioned in the plurality of the second bays 26. The plurality of the first retaining walls 23, the plurality of the second retaining walls 24, the plurality of the first bays 25 and the plurality of the second bays 26 together form the lateral wall 22.

When each pressing area 141 in the one direction of the directional pad 14 of the push button 1 is pressed downward, the corresponding projection part 15, and the first arc portion 161, the bending portion 162 and the second arc portion 163 of the corresponding elastic arm 16 all move downward. Meanwhile, the projection part 15, the first arc portion 161 and the bending portion 162 in the opposite direction which is opposite to the pressed pressing area 141 move upward, and the second arc portion 163 in the opposite direction abuts against a lower end of the stopping block 27 which is corresponding to the second arc portion 163 in the opposite direction. Thus, the button structure 100 has the excellent tactile feedback.

Referring to FIG. 7 to FIG. 10, the supporting unit 3 has a main body 31, a fixing rod 32, two side arms 33 and a positioning groove 34. The main body 31 is positioned on the upper surface of the circuit board 4. A bottom surface of the main body 31 is positioned on the upper surface of the circuit board 4. A middle of the main body 31 extends downward to form the fixing rod 32. The fixing rod 32 extends beyond the bottom surface of the main body 31. The fixing rod 32 penetrates through the circuit board 4, and the fixing rod 32 extends beyond a lower surface of the circuit board 4. Two opposite sides of the main body 31 extend outward to form the two side arms 33, respectively. The two side arms 33 of the supporting unit 3 are shown as Z shapes. The two side arms 33 are positioned on the upper surface of the circuit board 4. During an assembling process of the supporting unit 3, the two side arms 33 are deformed upward to avoid the two side arms 33 from abrading the circuit board 4. A middle of a top surface of the main body 31 is recessed downward to form the positioning groove 34. The positioning groove 34 is arranged corresponding to the protruding column 18 of the push button 1. The protruding column 18 of the push button 1 is positioned in the positioning groove 34.

The main body 31 has a top part 310, two side walls 311 extended downward from two opposite sides of the top part 310, two connecting walls 312, two openings 313 and two stiffeners 314. The top part 310 is disposed to the upper surface of the circuit board 4. The two side walls 311 are mounted on the upper surface of the circuit board 4. The two connecting walls 312 are mounted on the upper surface of the circuit board 4. In the present invention, the main body 31 is a hollow columnar structure. The top part 310 is shown as a hexagonal shape. In a concrete implementation, the main body 31 is without being limited to be the hollow columnar structure, and the top part 310 is without being limited to be the hexagonal shape. The fixing rod 32 is extended downward from a middle of a bottom surface of the top part 310. The two side arms 33 are extended outward from two middles of two outer surfaces of the two side walls 311, respectively. The two opposite sides of the top part 310 extend downward to form the two side walls 311. The two middles of the two outer surfaces of the two side walls 311 extend outward to form the two side arms 33, respectively. The two connecting walls 312 are arranged between the two side walls 311, and the two connecting walls 312 are connected between the two side walls 311. The main body 31 has the two openings 313 penetrating through two inner surfaces and two outer surfaces of the two connecting walls 312 and the bottom surface of the main body 31. The two openings 313 are used to increase an elasticity of the supporting unit 3. Two inner surfaces of the two side walls 311 extend inward to form the two stiffeners 314. The two stiffeners 314 are connected to the fixing rod 32, and the two stiffeners 314 are arranged corresponding to the two side arms 33. The two stiffeners 314 are used to enhance a structural strength of the supporting unit 3.

The fixing rod 32 has a fixing portion 321 extended downward from the bottom surface of the top part 310, two first extension portions 322 extended downward from a bottom surface of the fixing portion 321, two second extension portions 323, a plurality of slits 324, a plurality of tabs 325 and two buckling hooks 326. A front and a rear of a lower portion of an outer surface of the fixing rod 32 protrude outward to form the two buckling hooks 326. A middle of the bottom surface of the top part 310 of the main body 31 extends downward to form the fixing portion 321. The fixing portion 321 is a hollow columnar shape. Several portions of a periphery of the bottom surface of the fixing portion 321 extend downward to form two first extension portions 322 and two second extension portions 323. The two first extension portions 322 are separated from each other. The two second extension portions 323 are separated from each other. The two first extension portions 322 are arranged corresponding to the two openings 313 of the main body 31. The two second extension portions 323 are arranged corresponding to the two stiffeners 314 of the main body 31, and the two second extension portions 323 are connected to the two stiffeners 314 of the main body 31. The two second extension portions 323 are also arranged corresponding to the two side arms 33. Bottoms of the two first extension portions 322 and the two second extension portions 323 pass through the circuit board 4. The bottoms of the two first extension portions 322 and the two second extension portions 323 extend beyond the lower surface of the circuit board 4.

The two first extension portions 322 are parallel to each other, and the two second extension portions 323 are parallel to each other. The two first extension portions 322 and the two second extension portions 323 are spaced from one another. The two first extension portions 322 are opposite to each other. The two second extension portions 323 are opposite to each other. Each slit 324 is formed between one first extension portion 322 and one second extension portion 323 which are adjacent to each other. The plurality of the slits 324 provide avoiding spaces for elastic deformations of the two first extension portions 322 and two second extension portions 323 to prevent the fixing rod 32 from abrading the circuit board 4. Middles of outer surfaces of the two first extension portions 322 and the two second extension portions 323 extend outward to form the plurality of the tabs 325. The tabs 325 of the two second extension portions 323 are connected to the stiffeners 314 of the main body 31. The tabs 325 of the two first extension portions 322 and the two second extension portions 323 are used to increase the elasticity of the supporting unit 3. Two bottoms of the two outer surfaces of the two first extension portions 322 extend outward to form the two buckling hooks 326. The two buckling hooks 326 are extended outward from outer surfaces of the bottoms of the two first extension portions 322. The buckling hook 326 and the tab 325 of each first extension portion 322 are connected with each other. The two buckling hooks 326 of the two first extension portions 322 are positioned to the lower surface of the circuit board 4. The two buckling hooks 326 of the two first extension portions 322 hook the lower surface of the circuit board 4.

Each side arm 33 has an extension arm 331, a bending arm 332, a fixing end 333 and a positioning bump 334. The middle of the outer surface of each side wall 311 of the main body 31 horizontally extends outward to form the extension arm 331. An outer end of the extension arm 331 is bent downward to form the bending arm 332. A lower end of the bending arm 332 horizontally extends outward to form the fixing end 333. The fixing end 333 is fixed to the upper surface of the circuit board 4. A bottom surface of the fixing end 333 extends downward to form the positioning bump 334. In another word, an upper portion of the fixing end 333 is recessed downward to form the positioning bump 334 protruding beyond the bottom surface of the fixing end 333. The positioning bump 334 is fixed to a corresponding zone of the circuit board 4 to realize that the supporting unit 3 is located to the circuit board 4, and the supporting unit 3 is fixed to the circuit board 4.

In the present invention, the two side walls 311 of the main body 31 are symmetrical, the two connecting walls 312 of the main body 31 are symmetrical, the two openings 313 of the main body 31 are symmetrical, the two first extension portions 322 of the fixing rod 32 are symmetrical, the two second extension portions 323 of the fixing rod 32 are symmetrical, and the two side arms 33 are symmetrical to facilitate an automatic assembling operation.

In the present invention, an inside of the supporting unit 3 forms an inner space 35 that penetrates through the lower surface of the supporting unit 3. The inner space 35 is enclosed by the top part 310, the two side walls 311 and the two connecting walls 312. The fixing rod 32 extends downward to project out of the inner space 35. The bottoms of the two first extension portions 322 project out of the inner space 35, and the bottoms of the two second extension portions 323 project out of the inner space 35.

Referring to FIG. 2 to FIG. 10, the circuit board 4 has the metal button 41, a through hole 42 and two positioning holes 43. The metal button 41 is located on the upper surface of the circuit board 4. The through hole 42 penetrates through the upper surface and the lower surface of the circuit board 4. The through hole 42 is corresponding to the fixing rod 32 of the supporting unit 3. The fixing rod 32 of the supporting unit 3 passes through the through hole 42. The bottoms of the two first extension portions 322 and the two second extension portions 323 pass through the through hole 42. The two buckling hooks 326 pass through the through hole 42. The two buckling hooks 326 are buckled to the lower surface of the circuit board 4. The circuit board 4 has the two positioning holes 43 penetrating through the upper surface and the lower surface of the circuit board 4. The through hole 42 is located between the two positioning holes 43. The two positioning holes 43 are corresponding to the two positioning bumps 334 of the two side arms 33. Two bottom surfaces of the two side arms 33 are positioned on the upper surface of the circuit board 4. The two positioning bumps 334 of the two side arms 33 are positioned in the two positioning holes 43.

The circuit board 4 is fastened among the bottom surface of the main body 31, the bottom surfaces of the two side arms 33 and the top surfaces of the two buckling hooks 326 of the supporting unit 3. The circuit board 4 is fastened among bottom surfaces of the two side walls 311 of the main body 31, the bottom surfaces of the two side arms 33 and the top surfaces of the two buckling hooks 326 of the supporting unit 3, so that a location between the circuit board 4 and the supporting unit 3 and a fixation between the circuit board 4 and the supporting unit 3 are realized, and a sway of the circuit board 4 is prevented. During a process of assembling the supporting unit 3 and the circuit board 4, the two buckling hooks 326 are deformed outward after the two buckling hooks 326 pass through the through hole 42, so that the two buckling hooks 326 are prevented from abrading the circuit board 4.

In summary, the push button 1 has at least two pressing areas 141, at least two connection sections 17, at least two projection parts 15 and at least two elastic arms 16. The at least two pressing areas 141 are disposed on the top surface of the top wall 11 of the push button 1, and the at least two pressing areas 141 are positioned oppositely. The at least two connection sections 17 are connected to bottoms of the at least two pressing areas 141. The at least two projection parts 15 are extended outward from the at least two connection sections 17. The at least two elastic arms 16 are cantilevered. The at least two elastic arms 16 are extended along the circumferential direction of the push button 1 from the one sides of the at least two projection parts 15, and the at least two clastic arms 16 are extended in the same direction. The housing 2 is mounted around the push button 1. An inner surface of the housing 2 keeps a distance from upper surfaces of the at least two projection parts 15. Inner portions of the housing 2 abut against tail ends of the at least two elastic arms 16. The supporting unit 3 is mounted inside the push button 1. The push button 1 is disposed on the upper surface of the circuit board 4. The housing 2 is disposed on the upper surface of the circuit board 4. The bottoms of the at least two connection sections 17 are arranged corresponding to the circuit board 4, and the supporting unit 3 is fastened between the circuit board 4 and the push button 1. When each pressing area 141 in the one direction is pressed downward, the bottom of the corresponding connection section 17 presses downward on the circuit board 4, when the pressing area 141 is released, the corresponding connection section 17 moves upward and returns to the original position.

As described above, the plurality of the elastic arms 16 of the button structure 100 are used to provide the excellent hand feeling and the better tactile feedback for the user. Furthermore, the one side of each projection part 15 extends outward and along the circumferential direction of the push button 1 to form the first arc portion 161, and the one end of the first arc portion 161 is bent outward and then is bent inward to form the bending portion 162, so the bending portion 162 is used to reduce the risks of the plastic deformation and the fracture of the elastic arm 16, thereby the usage lifespan of the elastic arm 16 is increased. In addition, the one end of the bending portion 162 extends outward and along the circumferential direction of the push button 1 to form the second arc portion 163, so when each pressing area 141 in the one direction of the directional pad 14 of the push button 1 is pressed downward, the corresponding projection part 15, and the first arc portion 161, the bending portion 162 and the second arc portion 163 of the corresponding elastic arm 16 all move downward, simultaneously, the projection part 15, the first arc portion 161 and the bending portion 162 in the opposite direction which is opposite to the pressed pressing area 141 move upward, and the second arc portion 163 in the opposite direction abuts against the lower end of the stopping block 27 which is corresponding to the second arc portion 163 in the opposite direction. As a result, the button structure 100 is used in a game controller, improves an operating hand feeling in use, is assembled stably and lowers a cost.

What is claimed is:

1. A button structure, comprising:

a push button having an outer wall and a plurality of elastic arms, several portions of a bottom of the outer wall of the push button extending outward to form a plurality of projection parts, the plurality of the projection parts being evenly distributed around the outer wall of the push button, each projection part extending along a radial direction of the outer wall of the push button, one side of each projection part extending outward and along a circumferential direction of the push button to form an elastic arm, a middle of the elastic arm being arched outward and opposite to the outer wall, the elastic arm having a first arc portion, a bending portion and a second arc portion, the one side of each projection part extending outward and along the circumferential direction of the push button to form the first arc portion, one end of the first arc portion which is opposite to the one side of each projection part being bent outward and then being bent inward to form the bending portion, one end of the bending portion extending outward and along the circumferential direction of the push button to form the second arc portion, the second arc portion being disposed opposite to the first arc portion;

a housing enclosing the push button, several portions of a lower surface of the housing protruding downward to form a plurality of stopping blocks, the second arc portions of the plurality of the elastic arms abutting against bottom surfaces of the plurality of the stopping blocks;

a supporting unit mounted inside the push button; and a circuit board, the push button being disposed on an upper surface of the circuit board, the housing being disposed on the upper surface of the circuit board, the supporting unit being fastened between the circuit board and the push button.

2. The button structure as claimed in claim 1, wherein the housing has a top board, and a lateral wall connected to an outer periphery of the top board, several portions of a bottom surface of the top board extend downward to form the plurality of the stopping blocks.

3. The button structure as claimed in claim 2, wherein several portions of a bottom of the lateral wall extend downward to form a plurality of first retaining walls and a plurality of second retaining walls, the plurality of the first retaining walls are arranged corresponding to the first arc portions of the plurality of the elastic arms, the plurality of the first arc portions of the plurality of the elastic arms are positioned to inner surfaces of the plurality of the first retaining walls, the plurality of the second retaining walls are arranged corresponding to the second arc portions of the plurality of the elastic arms, the second arc portions of the plurality of the elastic arms are positioned to inner surfaces of the plurality of the second retaining walls, the plurality of the second retaining walls are arranged corresponding to the plurality of the stopping blocks, the inner surfaces of the plurality of the second retaining walls are connected to the plurality of the stopping blocks.

4. The button structure as claimed in claim 3, wherein the housing has a plurality of first bays and a plurality of second bays, the plurality of the first bays are formed among the plurality of the first retaining walls and the plurality of the second retaining walls, the plurality of the first bays are arranged corresponding to the bending portions of the plurality of the elastic arms, the bending portions of the plurality of the elastic arms are positioned in the plurality of the first bays.

5. The button structure as claimed in claim 4, wherein the plurality of the second bays are formed among the plurality of the first retaining walls and the plurality of the second retaining walls, the plurality of the second bays are arranged corresponding to the plurality of the projection parts, and the plurality of the projection parts are positioned in the plurality of the second bays, the plurality of the first retaining walls, the plurality of the second retaining walls, the plurality of the first bays and the plurality of the second bays together form a plurality of stopping parts, the plurality of the stopping parts are arranged corresponding to the plurality of the projection parts, and the elastic arms which are connected to the plurality of the projection parts, the plurality of the first retaining walls, the plurality of the second retaining walls, the plurality of the first bays and the plurality of the second bays together form the lateral wall.

6. The button structure as claimed in claim 1, wherein the push button is a hollow cylinder shape, and a bottom of the push button is opened freely.

7. A button structure, comprising:

a push button having a top wall, an outer wall, a plurality of elastic arms, and a directional pad formed on a top surface of the top wall, several portions of a bottom of the outer wall of the push button extending outward to form a plurality of projection parts, the plurality of the projection parts being evenly distributed around the outer wall of the push button, each projection part extending along a radial direction of the outer wall of the push button, the plurality of the projection parts being disposed corresponding to the directional pad, one side of each projection part extending outward and along a circumferential direction of the push button to form an elastic arm, a middle of the elastic arm being arched outward and opposite to the outer wall, the elastic arm having a first arc portion, a bending portion and a second arc portion, the one side of each projection part extending outward and along the circumferential direction of the push button to form the first arc portion, one end of the first arc portion which is opposite to the one side of each projection part being bent outward and then being bent inward to form the bending portion, one end of the bending portion extending outward and along the circumferential direction of the push button to form the second arc portion, the second arc portion being disposed opposite to the first arc portion;

a housing enclosing the push button, the housing having a top board, a plurality of first bays, a plurality of second bays, a plurality of stopping parts, and a lateral wall connected to an outer periphery of the top board, several portions of a bottom of the lateral wall extending downward to form a plurality of first retaining walls and a plurality of second retaining walls, the plurality of the first arc portions of the plurality of the clastic arms being positioned to inner surfaces of the plurality of the first retaining walls, the plurality of the second arc portions being positioned to inner surfaces of the plurality of the second retaining walls, the plurality of the first bays being formed among the plurality of the first retaining walls and the plurality of the second retaining walls, the bending portions of the plurality of the elastic arms being positioned in the plurality of the first bays, the plurality of the second bays being formed among the plurality of the first retaining walls and the plurality of the second retaining walls, the plurality of the projection parts being positioned in the plurality of the second bays, each stopping part including one first retaining wall, one second retaining wall, one first bay and one second bay, each stopping part being disposed corresponding to one projection part, and one elastic arm which is connected to the one projection part, the second arc portions of the plurality of the elastic arms abutting against inner portions of the plurality of the second retaining walls;

a supporting unit mounted inside the push button; and a circuit board, the push button being disposed on an upper surface of the circuit board, the housing being disposed on the upper surface of the circuit board, the supporting unit being fastened between the circuit board and the push button.

8. The button structure as claimed in claim 7, wherein several portions of a bottom surface of the top board extend downward to form a plurality of stopping blocks, the second arc portions of the plurality of the elastic arms abutting against bottom surfaces of the plurality of the stopping blocks, the plurality of the second retaining walls are arranged corresponding to the plurality of the stopping blocks, the inner surfaces of the plurality of the second retaining walls are connected to the plurality of the stopping blocks.

9. The button structure as claimed in claim 8, wherein the plurality of the stopping blocks are disposed to inner portions of the plurality of the second retaining walls.

10. The button structure as claimed in claim 7, wherein the push button has an annular inner wall, several portions of the inner wall protrude inward, and then extend upward and downward to form a plurality of connection sections, each connection section extends along a radial direction of the inner wall, the plurality of the connection sections are evenly distributed to an inner periphery of the inner wall along a peripheral direction of the inner wall, the plurality of the connection sections are disposed corresponding to the directional pad, the plurality of the connection sections are arranged corresponding to the plurality of the projection parts, outer portions of bottoms of the plurality of the connection sections are connected to inner portions of the plurality of the projection parts.

11. A button structure, comprising:

a push button having:

a top wall;

at least two pressing areas disposed on a top surface of the top wall, and the at least two pressing areas being positioned oppositely;

at least two connection sections connected to bottoms of the at least two pressing areas;

at least two projection parts extended outward from the at least two connection sections;

at least two clastic arms which are cantilevered, the at least two elastic arms being extended along a circumferential direction of the push button from one sides of the at least two projection parts, and the at least two elastic arms being extended in the same direction;

a housing mounted around the push button, an inner surface of the housing keeping a distance from upper surfaces of the at least two projection parts, inner portions of the housing abutting against tail ends of the at least two elastic arms;

a supporting unit mounted inside the push button; and a circuit board, the push button being disposed on an upper surface of the circuit board, the housing being disposed on the upper surface of the circuit board, bottoms of the at least two connection sections being arranged corresponding to the circuit board, and the supporting unit being fastened between the circuit board and the push button;

wherein when each pressing area in one direction is pressed downward, the bottom of the corresponding connection section presses downward on the circuit board, when the pressing area is released, the corresponding connection section moves upward and returns to an original position.

12. The button structure as claimed in claim 11, wherein an inside of the supporting unit forms an inner space that penetrates through a lower surface of the supporting unit, the supporting unit has a top part, two side walls extended downward from two opposite sides of the top part, two connecting walls arranged between the two side walls, a fixing portion extended downward from a bottom surface of the top part, two first extension portions extended downward from a bottom surface of the fixing portion, two buckling hooks extended outward from outer surfaces of bottoms of the two first extension portions, and two side arms extended outward from two middles of two outer surfaces of the two side walls, the two connecting walls are connected between the two side walls, the two first extension portions are separated from each other, the bottoms of the two first extension portions project out of the inner space.

13. The button structure as claimed in claim 12, wherein the top part is disposed to the upper surface of the circuit board, the two side arms are positioned on the upper surface of the circuit board, the two side walls are mounted on the upper surface of the circuit board, the two connecting walls are mounted on the upper surface of the circuit board, the two buckling hooks are positioned to a lower surface of the circuit board, the two buckling hooks hook the lower surface of the circuit board, the circuit board is fastened among bottom surfaces of the two side walls, bottom surfaces of the two side arms and top surfaces of the two buckling hooks.

* * * * *